United States Patent Office 3,032,060
Patented May 1, 1962

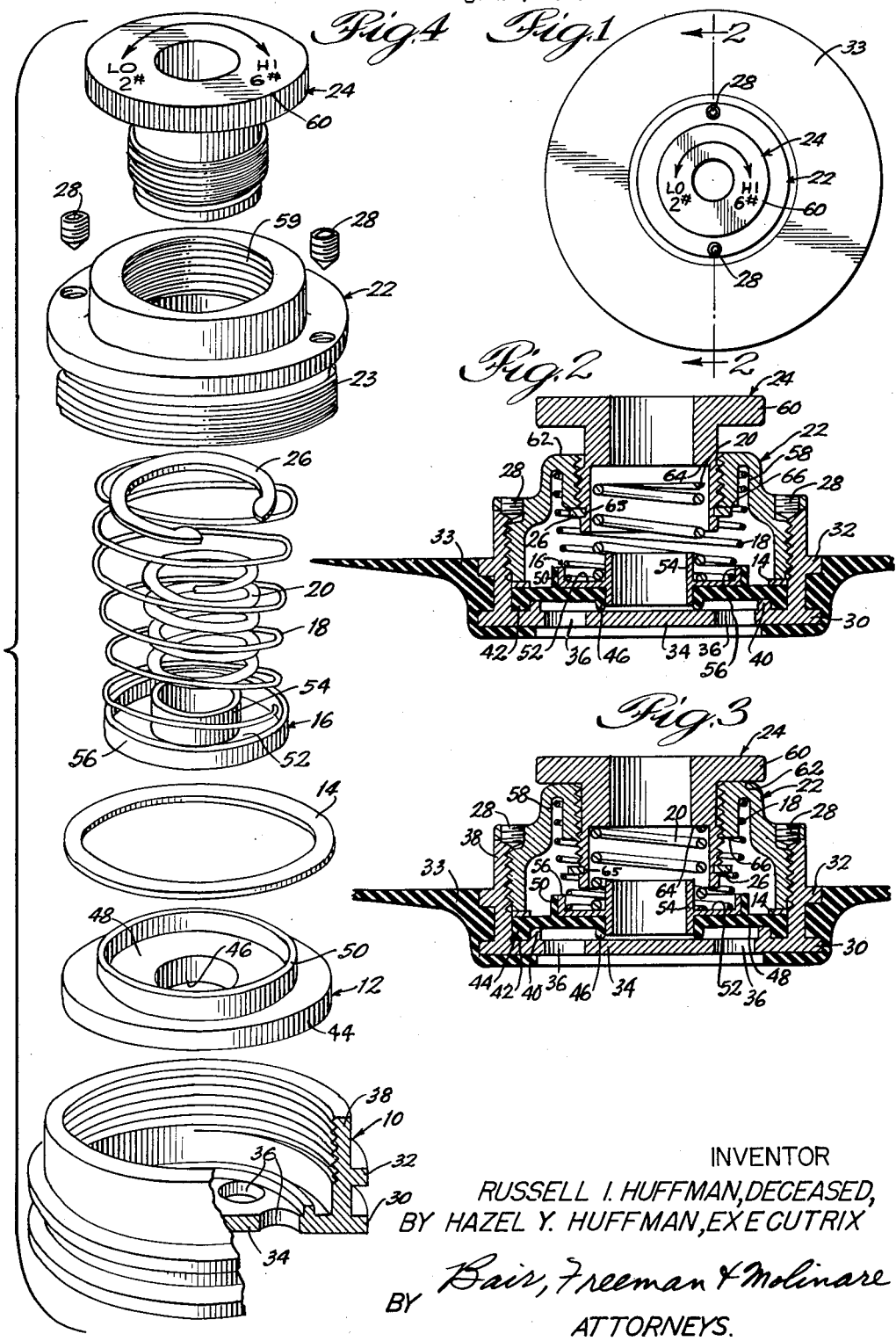

3,032,060
HIGH-LOW PRESSURE RELIEF VALVE FOR FLOTATION GEAR
Russell I. Huffman, deceased, late of Strasburg, Ohio, by Hazel Y. Huffman, executrix, Strasburg, Ohio, assignor to Knapp-Monarch Company, St. Louis, Mo., a corporation of Delaware
Filed Aug. 24, 1959, Ser. No. 835,485
7 Claims. (Cl. 137—516.15)

This invention relates to a relief valve and more particularly to a venting relief-valve which may be selectively set to vent at two different pre-selected pressures.

In gas-inflated devices it is frequently desirable to provide a relief valve to prevent obtaining of excessive pressures within the device which may cause the device to rupture. Where the inflatable device may be subject to varying external fluid pressures, in some instances it is desirable to provide for venting at different pre-selected pressures. A typical instance where a dual-pressure venting relief valve is desirable is for use with inflatable life jackets which may be worn by persons performing tasks under water, or which may be used for rescue of submariners whose craft may have become disabled.

When a person wearing an inflatable safety appliance is on, or adjacent, the surface of the water, the requisite pressure to keep the man afloat is 2 p.s.i. At atmospheric pressures, the danger point to avoid rupturing of the appliance may, for example, be 5 p.s.i. But when a person is at a depth of about 50 feet below the surface of the water, and when it is necessary to inflate the appliance, a gas pressure in the appliance of 2 p.s.i. will be insufficient to bring the man to the surface because of the water pressure. The pressure requirements under these conditions is 6 p.s.i. gas pressure within the inflatable device in order to bring the man to the surface, and the water pressures keep the device from rupturing under such high gas pressure. But, once at the surface, the requisite internal pressure is only 2 p.s.i.

Thus, one object of this invention is to provide an improved relief valve for venting gas-inflated devices at two different pre-selected pressures, whereby the relief valve may be selectively set for venting at a relatively low pressure condition within the inflated device when the device is subject to relatively low external pressures, and whereby the relief-valve may be selectively set for venting at a relatively high pressure condition within the inflated device when the device is subject to relatively high external pressures.

Another object of this invention is to provide an improved, selectively variable, pressure-venting relief valve for an inflatable device, which valve is designed so that the variation in venting pressure can not be lowered by the operator below a pre-selected pressure, thereby insuring that the relief valve will retain a pre-selected pressure within the inflatable device.

A further object of this invention is to provide a selectively variable pressure-venting relief valve which is characterized by its novelty and simplicity of construction and by its effectiveness of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a top plan view of a valve embodying the invention disclosed herein;

FIGURE 2 is a cross-section view taken on line 2—2 of FIGURE 1 and shows the manual control member in a position wherein the valve vents at a pre-selected, relatively low pressure;

FIGURE 3 is similar to FIGURE 2 but shows the manual control member in a second position wherein the valve is pre-set to vent at a pre-selected, relatively high pressure; and FIGURE 4 is a perspective, exploded, view of the valve of FIGURES 2 and 3, showing the various parts of said valve.

Referring now to the drawings, there is shown a dual-pressure relief valve which includes (as best seen in the exploded view of FIGURE 4) a body generally indicated at 10, a flexible and resilient diaphragm 12, a sealing ring or washer 14, a diaphragm insert 16, a low-pressure helical spring 18, a high-pressure helical spring 20, a cap 22, an adjusting screw member 24, a split retaining ring 26, and a pair of set screws 28.

More particularly, the body 10 is formed with a pair of outwardly extending annular flanges 30 and 32, arranged for anchoring cooperation with a patch member 33, which is adapted for securement to an inflatable appliance to which the valve is to be connected, as is presently well known in the art. The body 10 is also shaped to define an apertured valve plate 34, wherein a plurality of apertures 36 therethrough are arranged within an annular area of the valve plate. The body 10 is further shaped and arranged to define a sleeve 38, which is located outwardly of the annular area in which is disposed the apertures 36, and the inner periphery of the extended end of the sleeve 38 is threaded. Provided on valve plate 34 is an annular boss, or rib 40, located outwardly of the apertures 36, and spaced inwardly from the sleeve 38 so as to define an annular recess 42 between rib 40 and sleeve 38.

The diaphragm 12 is preformed to define an enlarged outer rim portion 44, which is shaped and arranged for snugly fitting into recess 42, and an enlarged inner circular rim, or rib, portion 46 that is arranged to be disposed inwardly of the apertures 36 in the valve plate 34. The enlarged circular rim portions 44 and 46 are interconnected by a relatively thin annular web portion 48 which overlies the annular area in which is disposed the apertures 36 in valve plate 34, and a portion of said web 48 is adapted to flex in response to varying pressures applied thereto, so that the inner, peripheral, valving portion of the diaphragm 12, including the sealing rib 46, may move toward and away from the valve plate 34.

The washer 14 is positioned on the rear side of diaphragm 12 substantially in alignment with the enlarged outer rim portion 44. The cap 22 has a threaded sleeve portion 23 for cooperation with the threaded sleeve 38 on body 10, and an edge of cap 22, serving as part of a retaining ring means, is arranged to engage sealing washer 14 to effect clamping and retention of the diaphragm 12 against valve plate 34 in the position seen in FIGURES 2 and 3, and to effect a sealing between the parts. The diaphragm 12 has an annular centering flange 50 thereon extending from web portion 48 oppositely relative to the projection of enlarged ribs 40 and 46 from web 48 of the diaphragm.

The diaphragm insert 16 includes a rigid annular backing plate portion 52 adapted to engage the back side of a portion of the diaphragm web 48 which is located radially inwardly of centering flange 50. The diaphragm insert 16 includes an inner sleeve, or ring, portion 54 disposed concentrically of the central aperture of the diaphragm 12 and inwardly of rim portion 46, and an outer sleeve, or flange, portion 56, which is located adjacent and concentrically inwardly of said said centering flange 50. The concentric sleeves and flanges cooperate to align the insert 16 on diaphragm 12.

The cap 22 is provided with an annular recess, or groove, 58 which opens inwardly toward diaphragm 12. The low pressure helical spring 18 is arranged and designed so that one end thereof abuts the rigid backing plate 52 radially inwardly of flange 56 while the other end thereof enters and is restrained in the groove 58 in cap 22 and abuts the inner end of groove 58.

The adjusting screw member 24 provides for manual control with regard to the high pressure spring 20. The high pressure spring 20 has one end thereof abutting the rigid backing plate 52 radially inwardly of the low pressure spring 18, and concentrically adjacent the rearward extension of sleeve 54 which serves as a positioning stud for spring 20. The opposite end of spring 20 is positioned so that it is adapted to be engaged by a shouldered portion of the adjusting screw 24, depending upon the position of the adjusting member 24. The adjusting member 24 is annular and is threadably connected to a female threaded portion 59 of cap 22. Said member 24 has a radially outwardly extending head, or flange, 60 adapted to abut an edge 62 of cap 22 at one end of the range of travel of the member 24, as seen in FIGURE 3, thereby serving as a stop means limiting axial movement. When in the position thus described, a shoulder 64 formed in member 24 engages the said other end of the high pressure spring 20 and imposes a force thereon. At the other end of its range of travel, the member 24 is in the position shown in FIGURE 2, and said member 24 is grooved at 65 to carry the split ring 26 therein; and the split ring 26, by engaging the inturned edge 66 of cap 22, serves as a stop means to limit outward axial movement of the adjusting member 24. In the low-pressure, or first, position shown in FIGURE 2, the adjusting member 24 is spaced from the said other end of high-pressure spring 20 so that spring 20 is inoperative to effect bias against the diaphragm means and the only force applied against diaphragm 12 is the force of the low-pressure spring 18 which constantly impresses its bias on the diaphragm means.

The set screws 28 are arranged to cooperate, as shown in FIGURES 2 and 3, between cap 22 and body 10 to lock those parts in position relative to each other after an adjustment has been made at the factory. The operation of the control member 34 is such that when it is in the low-pressure, or first, position of FIGURE 2, the pressure required to overcome the bias of spring 18, and to cause the sealing rib 46 on diaphgarm 12 to move away from the valve plate 34, is 2 p.s.i.; and when the control member is in the other extreme position, the high-pressure, or second, position shown in FIGURE 3, then the pressure required on the under side of diaphragm 12 to cause the diaphragm to overcome the combined bias of springs 18 and 20 and to move the sealing rib 46 away from its sealing engagement with valve plate 34, is 6 p.s.i.

Thus, there is provided herein a dual-pressure valve having an adjusting or control member which, when in one extreme position, is responsive to operation at a relatively low selected pressure, and when it is in the other extreme position, there is required a relatively high selected pressure at which the valve operates to relieve excess pressure thereon.

It is understood that the apertures 36 in valve plate 34 communicate the interior of an inflated appliance to the valve diaphragm 12, so that when the pressure within the appliance is below the pressure imposed upon the back, or outer, side of the diaphragm by the springs 18, or 18 and 20, then the diaphragm valve remains closed. However, when the gas pressure in the appliance exceeds the preselected bias on the diaphragm, then the diaphragm 12, and insert 16 carried thereon, moves away from sealing engagement with the valve plate 34, thereby permitting escape of gas through a vent passageway means, which includes the plate apertures 36, the central aperture of diaphragm 12, the sleeve 54 and the central aperture 25 of adjusting member 24, until the gas pressure within the appliance drops to a point where the diaphragm is moved back, under the bias of the springs, to its said sealing position against the valve plate 34. The adjusting member 24 provides means for presetting two specific pressures at which pressure relief is achieved by the valve disclosed herein.

FIGURE 1 illustrates that the manual control 24 is provided with markings on the exposed surface thereof which show the direction in which the control 24 must be manually screwed to cause the valve to vent selectively at 2 p.s.i. or 6 p.s.i.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What is claimed as new, and desired to secure by Letters Patent of the United States, is:

1. A venting, dual-pressure, relief valve comprising, in combination, a valve plate having aperture means therethrough arranged within an annular area, annular diaphragm means including a flexible diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, and a movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a first spring which abuts said diaphragm and which constantly impresses its bias thereagainst, and a second spring positioned to abut said diaphragm and effecting its bias against said diaphragm only with said manual control engaging said second spring when the control is in said second position, and said second spring being totally inoperative to effect bias against said diaphragm when said control is in said first position.

2. A venting, dual-pressure, relief valve comprising, in combination, a valve plate having aperture means therethrough arranged within an annular area, annular diaphragm means including a flexible diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, and a movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a first spring means which abuts said diaphragm and which constantly impresses its bias thereagainst, and a second spring positioned to abut said diaphragm and effecting its bias against said diaphragm only with said manual control engaging said second spring when the control is in said second position, and said second spring being totally inoperative to effect bias against said diaphragm when said control is in said first position, said manual control being carried by structure supported on said valve plate and being screw threaded for movement toward and away from said diaphragm, and a pair of spaced stop elements on said manual control each adapted to engage a portion of said structure to limit movement of said manual control in one direction relative to said diaphragm, thereby defining two positions of said manual control.

3. A venting, dual-pressure, relief valve comprising, in combination, a planar valve plate having aperture means therethrough arranged within an annular area, annular diaphragm means including a flexible annular diaphragm member substantially parallel to said valve plate and overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, and an accessible movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, an annular rigid backing plate engaging said diaphragm and movable therewith and serving as an abutment which said spring means engage, and means aligning said backing plate relative to said diaphragm including engaging concentric annular flanges on said diaphragm and backing plate spaced from the central aperture through said annular diaphragm.

4. A dual-pressure relief valve comprising, in combination, a valve plate having aperture means therethrough arranged within an annular area, an annular flexible diaphragm overlying said apertured annular area of said valve plate, retaining ring means clamping an outer peripheral portion of said diaphragm, located outwardly of said apertured area of said valve plate, against said valve plate to effect a seal, there being an inner peripheral valving portion of said diaphragm, located inwardly of said apertured area of said valve plate, arranged to move toward and away from said valve plate in response to variations in force applied to said diaphragm, a first spring means biasing said diaphragm toward said valve plate with a first force, a second spring means adapted to impress a second force against said diaphragm, and a movable manual control for association with said second spring means, said manual control when in a first position being spaced from said second spring means and inoperative to effect impressing of said second force against said diaphragm, whereby a first pressure on said diaphragm is required to overcome the bias of only said first spring means, said manual control when in a second position being operative to engage said second spring means to effect impression of said second force against said diaphragm, whereby a second pressure on said diaphragm is required to overcome the combined biases of said first and second spring means, said retaining ring means defining therein an annular groove which opens toward said diaphragm, and one end of said first spring means being located and restrained in said annular groove.

5. A dual-pressure relief valve comprising, in combination, a valve plate having aperture means therethrough arranged within an annular area, an annular flexible diaphragm overlying said apertured annular area of said valve plate, annular retaining ring means clamping an outer peripheral portion of said diaphragm, located outwardly of said apertured area of said valve plate, against said valve plate to effect a seal, there being an inner peripheral valving portion of said diaphragm, located inwardly of said apertured area of said valve plate, arranged to move toward and away from said valve plate in response to variations in force applied to said diaphragm, a first spring means biasing said diaphragm toward said valve plate with a first force, a second spring means adapted to impress a second force against said diaphragm, and a movable manual control for association with said second spring means, said manual control when in a first position being spaced from said second spring means and inoperative to effect impressing of said second force against said diaphragm, whereby a first pressure on said diaphragm is required to overcome the bias of only said first spring means, said manual control when in a second position being operative to engage said second spring means to effect impression of said second force against said diaphragm, whereby a second pressure on said diaphragm is required to overcome the combined biases of said first and second spring means, said manual control being an annular part screw-threaded in said annular retaining ring means, and a pair of spaced stop elements on said manual control each adapted to engage said retaining ring means to limit movement of said manual control in one direction relative to said retaining ring means, thereby defining two positions of said manual control.

6. A dual-pressure relief valve comprising, in combination, a valve plate having aperture means therethrough arranged within an annular area, an annular flexible diaphragm overlying said apertured annular area of said valve plate, retaining means clamping an outer peripheral portion of said diaphragm, located outwardly of said apertured area of said valve plate, against said valve plate to effect a seal, there being an inner peripheral valving portion of said diaphragm, located inwardly of said apertured area of said valve plate, arranged to move toward and away from said valve plate in response to variations in force applied to said diaphragm, a first spring means biasing said diaphragm toward said valve plate with a first force, a second spring means adapted to impress a second force against said diaphragm, and a movable manual control for association with said second spring means, said manual control when in a first position being spaced from said second spring means and inoperative to effect impressing of said second force against said diaphragm, whereby a first pressure on said diaphragm is required to overcome the bias of only said first spring means, said manual control when in a second position being operative to engage said second spring means to effect impression of said second force against said diaphragm, whereby a second pressure on said diaphragm is required to overcome the combined biases of said first and second spring means, an annular rigid backing plate engaging said diaphragm and movable therewith and serving as an abutment which said spring means engage, a sleeve on said backing plate projecting from both sides of said plate, the projection of said sleeve to one side of said backing plate being positioned concentrically in the central opening of said diaphragm, and the projection of said sleeve to the other side of said backing plate serving as a positioning stud for cooperation with said second spring means.

7. A dual-pressure relief valve comprising, in combination, a valve member defining a valve plate and an annular connector portion extending therefrom, aperture means through said valve plate arranged within an annular area spaced inwardly of said connector portion, an annular flexible diaphragm overlying said apertured annular area of said valve plate, annular retaining-ring means secured to said connector portion and clamping an outer peripheral portion of said diaphragm, located outwardly of said aperture area of said valve plate, against said valve plate to effect a seal, there being an inner peripheral valving portion of said diaphragm, located inwardly of said apertured area of said valve plate, arranged to move toward and away from said valve plate in response to variations in force applied to said diaphragm, a first spring means biasing said diaphragm toward said valve plate with a first force, a second spring means adapted to impress a second force against diaphragm, and a movable manual control for association with said second spring means, said manual control when in a first position being spaced from said second spring means and inoperative to effect impressing of said second force against said diaphragm, whereby a first pressure on said diaphragm is required to overcome the bias of only said first spring means, and said manual control when in a second position being operative to engage said second spring means to effect impressions of said second force against said diaphragm, whereby a second pressure on said diaphragm is required to overcome the combined biases of said first and second spring means.

References Cited in the file of this patent
UNITED STATES PATENTS

| | | |
|---|---|---|
| 1,370,459 | Lippoldt | Mar. 1, 1921 |
| 1,737,588 | Hopkins | Dec. 3, 1929 |
| 2,052,098 | Lockett | Aug. 25, 1936 |
| 2,306,903 | Ray | Dec. 29, 1942 |
| 2,508,403 | Knauss | May 23, 1950 |
| 2,657,704 | Fausek | Nov. 3, 1953 |
| 2,727,529 | Kodet | Dec. 20, 1955 |
| 2,770,255 | Goddard | Nov. 13, 1956 |
| 2,854,996 | Hughes | Oct. 7, 1958 |
| 2,908,288 | Carr | Oct. 13, 1959 |